United States Patent
Haga

(10) Patent No.: US 11,926,749 B2
(45) Date of Patent: Mar. 12, 2024

(54) AQUEOUS INK COMPOSITION FOR WRITING INSTRUMENTS

(71) Applicant: MITSUBISHI PENCIL COMPANY, LIMITED, Tokyo (JP)

(72) Inventor: Hisato Haga, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 541 days.

(21) Appl. No.: 17/281,421

(22) PCT Filed: Oct. 2, 2019

(86) PCT No.: PCT/JP2019/038924
§ 371 (c)(1),
(2) Date: Mar. 30, 2021

(87) PCT Pub. No.: WO2020/071427
PCT Pub. Date: Apr. 9, 2020

(65) Prior Publication Data
US 2021/0340394 A1  Nov. 4, 2021

(30) Foreign Application Priority Data
Oct. 3, 2018 (JP) .................................. 2018-188325

(51) Int. Cl.
*C09D 11/16* (2014.01)
*C08L 57/12* (2006.01)

(52) U.S. Cl.
CPC .............. *C09D 11/16* (2013.01); *C08L 57/12* (2013.01); *C08L 2201/54* (2013.01)

(58) Field of Classification Search
CPC ................................ C09D 11/16; C08L 57/12
USPC ......................................................... 523/161
See application file for complete search history.

(56) References Cited

U.S. PATENT DOCUMENTS

| | | | |
|---|---|---|---|
| 6,700,010 B1 | 3/2004 | Hanselmann et al. | |
| 2005/0048396 A1* | 3/2005 | Mulligan | B41M 5/395 430/199 |
| 2010/0285140 A1 | 11/2010 | Shirotake | |

FOREIGN PATENT DOCUMENTS

| | | |
|---|---|---|
| JP | H07331151 A | 12/1995 |
| JP | H0848929 A | 2/1996 |
| JP | 2002138231 A | 5/2002 |
| JP | 2013124333 A | 6/2013 |
| JP | 2015010125 A | 1/2015 |
| JP | 2015196745 A | 11/2015 |
| JP | 2017081852 A | 5/2017 |
| WO | 01/16092 A1 | 3/2001 |
| WO | 2009084494 A1 | 7/2009 |
| WO | 2014/142014 A1 | 9/2014 |

OTHER PUBLICATIONS

International Search Report (PCT/ISA/210) with an English translation, and Written Opinion (PCT/ISA/237) dated Nov. 5, 2019, by the Japanese Patent Office as the International Searching Authority for International Application No. PCT/JP2019/038924. (8 pages).
Extended European Search Report dated Jun. 20, 2022, by the European Patent Office in corresponding European Patent Application No. 19869962.1. (5 pages).

* cited by examiner

*Primary Examiner* — Deve V Hall
(74) *Attorney, Agent, or Firm* — BUCHANAN, INGERSOLL & ROONEY PC

(57) ABSTRACT

Provided is an aqueous ink composition for writing instruments which is excellent in an antibacterial property and an antifungal property without damaging storage stability and writing performances. The aqueous ink composition for writing instruments according to the present invention is characterized in that at least particles comprising principally a polymer represented by the following Formula (I) are contained as an active ingredient and that a content thereof is 0.1 to 30 mass %:

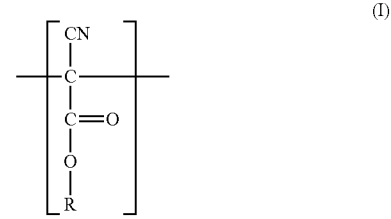

wherein R is an alkyl group having 2 to 8 carbon atoms.

2 Claims, No Drawings

AQUEOUS INK COMPOSITION FOR WRITING INSTRUMENTS

TECHNICAL FIELD

The present invention relates to an aqueous ink composition for writing instruments which is excellent in an antiseptic effect (fungous resistance and mildew resistance) without damaging storage stability and writing performances.

BACKGROUND ART

Several materials have so far been known as preservatives and the like used for aqueous ink compositions for writing instruments.

Known are, for example, 1) an ink composition for an aqueous ball point pen containing an aqueous ink basic composition comprising a colorant comprising (pigment and pigment dispersant) and/or a colored resin emulsion, a water-soluble organic solvent, a pseudo-plasticity-imparting agent, and water, and a salt of a cross-linking type acrylic acid polymer of 0.05 to 0.5% by weight of the aqueous ink composition, and an antiseptic agent such as 1,2-benzisothiazoline-3-one (refer to, for example, a patent document 1), 2) an aqueous ink composition prepared by finely dispersing a water-insoluble colorant and a particulate resin composition in an aqueous medium, wherein the particulate resin composition comprises an oil-soluble fungicide and a water-insoluble polymer (refer to, for example, a patent document 2), 3) a reversible thermochromic aqueous ink composition comprising water, a water-soluble organic solvent, (a) an electron-donating coloring organic compound, (b) an electron-acceptive compound, (c) a reversible thermochromic microcapsule pigment containing a reversible thermochromic composition comprising a reaction medium determining temperatures causing color reactions of the both described above, a comb type polymer dispersant having a carboxyl group on a side chain, a water-soluble resin, sugar alcohol having 3 or more carbon atoms, and a cationic preservative (refer to, for example, a patent document 3), and 4) an aqueous ink comprising at least colorant, water, polyhydric alcohol and a fungicide, wherein the fungicide described above contains 3-iodo-2-propynylbutylcarbamate. (refer to, for example, a patent document 4).

However, the fungicides and the like described in the foregoing patent documents 1 to 4 involve problems such as a limited use amount due to a safety problem, some adverse effects exerted to the other ink materials, or unsatisfactory effects exerted to specific pollution sources.

RELATED ART DOCUMENTS

Patent Documents

Patent document 1: JP-A 1996-48929 (claims, examples and the like)
Patent document 2: JP-A 2002-138231 (claims, examples and the like)
Patent document 3: JP-A 2015-10125 (claims, examples and the like)
Patent document 4: JP-A 2015-196745 (claims, examples and the like)

DISCLOSURE OF THE INVENTION

In light of the problems on the conventional technologies described above, the present invention intends to solve them, and an object thereof is to provide an aqueous ink composition for writing instruments which is excellent in an antiseptic effect (fungous resistance and mildew resistance) without damaging storage stability and writing performances.

Intense investigations repeated by the present inventors in light of the problems on the conventional technologies described above have resulted in finding that an aqueous ink composition for writing instruments which meets the object described above can be obtained by adding at least a specific amount of particles comprising a polymer having specific properties as a principal component, and thus the present invention has come to be completed.

That is, the aqueous ink composition for writing instruments according to the present invention is characterized in that at least particles comprising principally a polymer represented by the following Formula (I) are contained as an active ingredient and that a content thereof is 0.1 to 30 mass %:

[Chem 1]

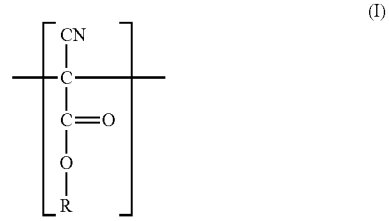

wherein R is an alkyl group having 2 to 8 carbon atoms.

The particles described above have preferably an average particle diameter of 10 to 800 nm.

According to the invention, provided is an aqueous ink composition for writing instruments which is excellent in an antiseptic effect (fungous resistance and mildew resistance) without damaging storage stability and writing performances.

The embodiment of the present invention shall be explained below in detail.

The aqueous ink composition for writing instruments according to the present invention is characterized in that particles comprising principally a polymer represented by the following Formula (I) are contained as an active ingredient and that a content thereof is 0.1 to 30 mass %:

[Chem 1]

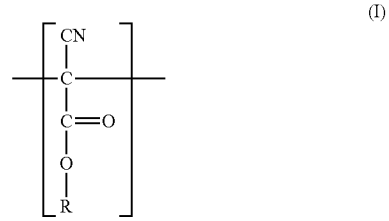

wherein R is an alkyl group having 2 to 8 carbon atoms.

The particles used in the present invention comprise principally the polymer represented by the foregoing Formula (I) as a main component and include, for example, 1) polymer particles having a structure represented by the Formula (I) described above in a repetitive unit and 2) particles containing a preservative and a fungicide in the polymer represented by the Formula (I) described above.

The term of comprising "principally" the polymer represented by the foregoing Formula (I) as an active ingredient means that the particles are constituted by 50 mass % or more, preferably 70 mass % or more of the polymer represented by the Formula (I) described above.

The alkyl group having 2 to 8 carbon atoms in the Formula (I) described above includes ethyl, propyl (straight, branched), butyl (straight, branched), pentyl (straight, branched), hexyl (straight, branched), heptyl (straight, branched), and octyl (straight, branched), preferably butyl having 4 carbon atoms and octyl having 8 carbon atoms used as an adhesive for suturing wounds in a surgery region, particularly preferably isobutyl, n-octyl and 2-octyl.

In the present invention, the polymer particles having the structure represented by the Formula (I) of 1) described above in the repetitive unit adheres to a cell wall of bacterium to disturb synthesis of the cell wall, dissolve the bacterium and prevent the bacterium (including meldew) from growing to thereby become particles having an antiseptic effect (fungous resistance and mildew resistance) by itself.

These particles are obtained, for example, by polymerizing the structural unit (monomer) represented by the Formula (I) described above by anionic polymerization. The polymerization chemicals used for the initiation and the stabilization of the polymerization include at least one kind of sugar selected from the group consisting of polyoxyethylene sorbitan fatty acid esters and monosaccharides and disaccharides having hydroxyl groups.

The polyoxyethylene sorbitan fatty acid esters include, for example, polyoxyethylene sorbitan laurate, polyoxyethylene sorbitan palmitate, polyoxyethylene sorbitan stearate, and polyoxyethylene sorbitan oleate.

Also, the effect thereof can be further enhanced by using a sugar as a polymerization chemical apart from the polyoxyethylene sorbitan fatty acid ester described above.

Any sugar of the monosaccharide and the disaccharide having a hydroxyl group may be used as the sugar, and preferred examples thereof include glucose, mannose, ribose, fructose, maltose, trehalose, lactose, and sucrose. These sugars may be either a ring type or a chain type; and in a case of the ring type, it may be either of a pyranose type and a furanose type. While sugars have various isomers, either of them may be used. Usually, the monosaccharide is present in the form of the pyranose type or the furanose type, and the disaccharide is the product of α-bonding or β-bonding. The sugars having such usual forms can be used as they are. The monosaccharide and the disaccharide can be used alone or in combination of two or more kinds thereof.

Usually, water (distilled water, refined water, purified water and the like) is used as a solvent of the polymerization reaction. Anionic reaction is initiated by a hydroxyl ion, so that pH of a reaction solution exerts influence on a polymerization rate. When the pH of the reaction solution is high, a concentration of a hydroxyl ion gets higher, so that the polymerization is accelerated, while the pH is low, the polymerization rate gets slower. Usually, a suitable polymerization rate is obtained under acidity of pH 2 to 4. Acid added for acidifying the reaction solution shall not specifically be restricted, and phosphoric acid, hydrochloric acid, acetic acid, phthalic acid, citric acid and the like which exert no adverse influences on the reaction can preferably be used.

A concentration of the structural unit represented by the Formula (I) described above in the polymerization reaction solution at the reaction initiation shall not specifically be restricted, and it is usually 0.1 to 10 mass %, preferably 1 to 5 mass %. Also, a concentration of the polymerization chemical (when plural kinds thereof are used, a total concentration thereof) in the polymerization reaction solution at the reaction initiation shall not specifically be restricted, and it is usually 1 to 30 mass %, preferably 5 to 20 mass %. The reaction temperature shall not specifically be restricted, and the reaction is carried out preferably at room temperature as it is simple. The reaction time shall not specifically be restricted, and it is usually about 0.5 to 4 hours. The polymerization reaction is carried out preferably under stirring. The particles are used usually in a form of neutral particles, and therefore after finishing the reaction, a base such as a sodium hydroxide aqueous solution and the like is preferably added to the reaction solution to neutralize it.

The structural unit represented by the Formula (I) described above is subjected to anionic polymerization by the polymerization reaction described above to form the polymer particles having the structure represented by the Formula (I) in the repetitive unit. An average particle diameter of the particles obtained by the method described above shall not specifically be restricted, and it is preferably less than 1000 nm, more preferably 10 to 800 nm and particularly preferably 10 to 200 nm in terms of usability for the aqueous ink composition for writing instruments, dispersion stability and a surface area.

The average particle diameter can be controlled by adjusting a concentration of the structural unit represented by the Formula (I) described above in the reaction solution, the kind of the polymerization chemical used and an amount thereof, the reaction time and the like. The resulting particles can be recovered, if necessary, by a conventional method such as centrifugal ultrafiltration and the like.

The "average particle diameter" prescribed in the present invention is a histogram average particle diameter measured by scattered light intensity distribution, and in the present invention (including the examples described later), it is a value of D50 measured by means of a particle size distribution measuring device (FPAR1000 manufactured by Otsuka Electronics Co., Ltd.).

The polymer particles having the structure represented by Formula (I) described above in the repetitive unit are, as described above, polymer particles having an antiseptic effect (fungous resistance and mildew resistance).

Further, the particles of 2) described above can be obtained by causing a preservative and a fungicide used for an ink composition for writing instruments to be involved (enveloped) inside the polymer particles having the structure represented by the foregoing Formula (I) in the repetitive unit.

The particles of 2) described above can be produced by adding the desired preservative or fungicide, for example, in the process of producing the particles of 1) to cause the preservative and the fungicide used for the desired ink composition for writing instruments to be involved (enveloped) inside the particles at the same time as forming the particles by the method of 1) described above.

The usable preservative and fungicide include at least one kind of, for example, sodium pentachlorophenol, 1,2-benzoisothiazoline-3-one, 2,3,5,6-tetrachloro-4(methylsulfonyl)pyridine, paraoxybenzoic acid ester, phenol, sodium benzoate, sodium dehydroacetate, sodium sorbate, morpholine, cresol, methylisothiazolinone, chloromethylisothiazolinone, octylisothiazolinone, dichlorooctylisothiazolinone, hexahydro-1,3,5-tris(2-hydroxyethyl)-1,3,5-triazine, 2-bromo-2-nitropropane-1,3-diol, sodium 2-pyridinethioloxide, sodium pyrithione, and 2-(4-thiozolyl) benzimidazole.

These preservatives and fungicides are caused, even in a case where they are restricted in a use amount by themselves due to a safety problem, where any adverse effects are exerted on the other ink materials or where effects exerted on specific pollution sources are unsatisfactory, to be involved (enveloped) in the polymer particles having the structure represented by the Formula (I) described above in the repetitive unit, whereby limitation of the use amount can be avoided by an integral action with fungous resistant and mildew resistant effects of the particles alone, and the use amount can be reduced to the utmost. Further, even in the case where the preservative and the fungicide used for the ink composition for writing instruments exert unsatisfactory effects on the specific pollution sources, excellent fungous resistance and mildew resistant effect can be exerted by an integral action with antibacterial actions and the like of the particles alone.

More preferably, 1,2-benzoisothiazoline-3-one, methylisothiazolinone, chloromethylisothiazolinone, octylisothiazolinone, dichlorooctylisothiazolinone, and hexahydro-1,3,5-tris(2-hydroxyethyl)-1,3,5-triazine are desirable as the preservative and the fungicide contained in the particles of 2) described above.

Amounts of the preservative and the fungicide caused to be involved (enveloped) can be suitably set according to the quality of the preservative and the fungicide, the use amounts thereof required in use, and the like. It is, for example, around 0.1 to 35 mass % based on a whole amount of the particles, but it shall not be restricted to the above range.

An average particle diameter of the particles causing the preservative and the fungicide to be involved (enveloped) shall not specifically be restricted, and it is, as is the case with the particles of 1) described above, less than 1000 nm, preferably 10 to 800 nm.

The respective particles of 1) to 2) having the characteristics described above can be used alone respectively or in combination of two or more kinds thereof, and a (total) content of the active ingredients is 0.1 to 30 mass %, preferably 0.1 to 10 mass % based on a whole amount of the ink composition.

In the present invention, the "active ingredient" means only a component exerting an antiseptic effect (fungous resistance and mildew resistance), and in a case of, for example, 1) and 2) described above, the respective components such as the polymerization chemicals (polyoxyethylene sorbitan fatty acid ester and sugar) used for the polymerization and water are not included therein. In the case of 1) described above, the particles themselves containing no respective components such as the polymerization chemicals and the like are the active ingredient, and in the case of 2) described above, the particles themselves containing no polymerization chemicals and the preservative component and the fungicide component involved in or copolymerized with the particles are the active ingredients.

If the content of the active ingredient is less than 0.1 mass %, the effects of the present invention cannot be exerted, and on the other hand, if it exceeds 30 mass %, the dispersion stability is liable to be damaged, so that they are not preferred.

A colorant and a water-soluble solvent which are conventional for the aqueous ink composition for writing instruments in addition to the particles of 1) to 2) having the characteristics described above are contained in the aqueous ink composition for writing instruments according to the present invention.

The usable colorant includes water-soluble dyes, pigments such as inorganic pigments, organic pigments or plastic pigments, hollow resin particles having voids inside the particles as white pigments and resin particles (pseudo pigments) dyed with dyes excellent in coloring property and dispersibility.

Any of direct dyes, acid dyes, edible dyes and basic dyes can be used as the water-soluble dyes at a suitable amount as long as the effects of the present invention are not damaged.

Glycols such as ethylene glycol, diethylene glycol, triethylene glycol, propylene glycol, polyethylene glycol, 3-butylne glycol, thiodiethylene glycol, glycerin and the like, glycol ethers such as ethylene glycol monomethyl ether, diethylene glycol monomethyl ether, propylene glycol monomethyl ether and the like can be used alone or in a mixture as the usable water-soluble solvent. A content of the water-soluble solvent is desirably 5 to 40 mass % based on a whole amount of the aqueous ink composition for writing instruments.

In addition to the particles having the characteristics described above, the colorant and the water-soluble solvent, water (tap water, refined water, distilled water, ion-exchanged water, purified water and the like) as the balance which is a solvent, and in addition thereto, a dispersant, a lubricant, a pH adjuster, a rust-preventive agent, a thickener, an evaporation inhibitor, a surfactant and the like can be suitably contained in the aqueous ink composition for writing instruments according to the present invention as long as the effects of the present invention are not damaged.

The usable dispersant includes nonionic or anionic surfactants and water-soluble resins. Water-soluble polymers are preferably used.

The lubricant includes nonionic lubricants such as fatty acid esters of polyhydric alcohols which can be used as well for a surface treating agent of pigments, higher fatty acid esters of sugars, polyoxyalkylene higher fatty acid esters, and alkylphosphoric acid esters, anionic lubricants such as alkylsulfonic acid salts of higher fatty acid amides and alkylallylsulfonic acid salts, derivatives of polyalkylene glycols, fluorine-based surfactants and polyether-modified silicones.

The pH adjuster includes ammonia, urea, monoethanolamine, diethanolamine, triethanolamine, alkali metal salts of carbonic acid and phosphoric acid such as sodium tripolyphosphate and sodium carbonate, and hydrates of alkali metals such as sodium hydroxide. The rust-preventive agent includes benzotriazole, tolyltriazole, dicyclohexylamonium nitrite, saponins and the like.

The thickener includes carboxymethyl cellulose (CMC) or salts thereof, fermented cellulose, crystalline cellulose, polysaccharides, and the like. The usable polysaccharides include, for example, xanthan gum, guar gum, hydroxypropylated guar gum, casein, gum arabic, gelatin, amylose, agarose, agaropectin, arabinan, curdlan, callose, carboxymethyl starch, chitin, chitosan, quince seed, glucomannan, gellan gum, tamarind seed gum, dextran, nigueran, hyaluronic acid, pustulan, funoran, HM pectin, porphyran, laminaran, lichenan, carrageenan, alginic acid, tragacanth gum, alkashi gum, succinoglycan, locust bean gum, tara gum, and the like. They may be used alone or in combination of two or more kinds thereof. Also, commercial products thereof can be used if available.

The evaporation inhibitor includes, for example, pentaerythritol, p-xylene glycol, trimethylolpropane, triethylolpropane, dextrin, and the like.

The surfactant includes, for example, fluorine base surfactants, silicone-base surfactants, acetylene glycol-base surfactants and the like.

The aqueous ink composition for writing instruments according to the present invention can be prepared by suitably combining the particles having the characteristics described above, the water-soluble solvent and the other respective components according to uses of writing instruments (ball point pens, marking pens and the like) and stirring and mixing them by means of a stirrer such as a homo mixer, a homogenizer, a disper and the like, and, if necessary, removing larger particles in the ink composition by filtration or centrifugal separation.

A pH (25° C.) of the aqueous ink composition for writing instruments according to the present invention is adjusted preferably to 5 to 10, more preferably to 6 to 9.5 by a pH adjusting agent in terms of usability, safety, stability of the ink itself and a matching property with the ink reservoir.

The aqueous ink composition for writing instruments according to the present invention is mounted in ball point pens, marking pens and the like which are provided with pen tip parts such as a ball point pen tip, a fiber tip, a felt tip and a plastic tip.

The ball point pen includes an ink reservoir (refill) for a ball point pen provided with a ball having a diameter of 0.18 to 2.0 mm, wherein the aqueous ink composition for writing instruments having the characteristics described above is stored therein, and an ink follower of a substance having no compatibility with the aqueous ink composition stored in the ink reservoir and having a smaller specific gravity than the aqueous ink composition, for example, a polybutene, a silicone oil, a mineral oil and the like.

The structures of the ball point pen and the marking pen shall not specifically be restricted and may be, for example, a ball point pen and a marking pen of a direct liquid type provided with a collector structure (ink holding mechanism) in which a barrel itself is used as an ink reservoir charged with the aqueous ink composition for writing instruments having the constitution described above.

Since in the aqueous ink composition for writing instruments thus constituted according to the present invention, the used particles having the characteristics described above are blended in the aqueous ink composition for writing instruments, an antiseptic effect (fungous resistance and mildew resistance) can be exerted in the aqueous ink composition to maintain a duration effect thereof over a long period of time. In addition thereto, the particles are not damaged in storage stability and writing performance, so that the aqueous ink composition for writing instruments suited to writing instruments such as a ball point pen and a marking pen comes to be obtained.

EXAMPLES

Next, the present invention shall be explained below in further details with reference to Production examples, Examples and Comparative examples, but the present invention shall not be restricted to the following examples and the like.

Production Examples 1 to 8: Production of Particles A to H

The respective particles were produced in the following production examples. "Parts" described below represent parts by mass.

Production Example 1: Production of Particles A

A flask of 2 liters was equipped with a stirrer, a reflux condenser and a thermometer and set in a water bath. It was charged with 93.8 parts of distilled water, 2 parts of polyoxyethylene sorbitan monolaurate (20E.O), 0.2 part of phosphoric acid, and 4 parts of a monomer in which R in Formula (I) is iso-butyl, and the mixture was stirred for about 15 minutes to finish anionic polymerization and obtain a dispersion of particles (particles A). An average particle diameter of the particles was 108 nm.

Production Examples 2 to 8: Production of Particles B to H

Dispersions of the respective particles (particles B to H) were obtained in the same manner as in Production Example 1 described above in the blend compositions shown in the following Table 1. The average particle diameters of the respective particles are shown in the following Table 1.

Examples 1 to 10 and Comparative Example 1

The respective particles obtained above were used to obtain aqueous ink compositions for writing instruments in the blend compositions (particles A to H, colored resin fine particles, triethanolamine, ethylene glycol and distilled water) shown in the following Table 2 by a conventional method. The respective dispersions (particles) obtained by concentrating the dispersions of the respective particles up to 25% by mass of the active ingredients were used for the particles A to H.

Colored resin fine particle dispersions obtained by the following production method were used for the colored resin fine particles.
Production of Colored Resin Fine Particles:

The flask of 2 liters was equipped with a stirrer, a reflux condenser, a thermometer, a nitrogen gas introducing pipe, and a 1000 ml separating funnel for charging a monomer and set in a water bath. It was charged with 500 g of distilled water, 50 g of a polymerizable surfactant (ADEKA REASOAP SE-10N, manufactured by ADEKA Corporation), and 3 g of ammonium persulfate, and inner temperature thereof was elevated up to 50° C. while introducing nitrogen gas.

On the other side, a solution was prepared by mixing a 500 g of a mixed monomer consisting of 300 g of 2-methacyloyloxyethyl phthalate (ACRYL ESTER PA, manufactured by Mitsubishi Rayon Co., Ltd.) as a monomer and 200 g of n-butyl methacrylate as the other monomer with 40 g of a water-soluble basic dye (AIZEN CATHILON RED BLH 200%, manufactured by Hodogaya Chemical Co., Ltd.).

The solution prepared above was added into the flask maintained in the vicinity of 50° C. from the separating funnel described above over 3 hours under stirring to have emulsion-polymerization. Further, the solution was aged for 5 hours to finish the polymerization and obtain a dispersion (particles) of colored resin fine particles for an aqueous ink. The colored resin fine particles had an average particle diameter of 80 nm and a resin solid content of 30 mass %.

The respective aqueous ink compositions (whole amount 100 mass %) for writing instruments obtained were evaluated concerning an antibacterial property by the following evaluation method. The results thereof are shown in the following Table 2.

Test Method of an Antiseptic Effect (Fungous Resistance and Mildew Resistance)

The antiseptic effect was evaluated by the following microorganism test method based on ISO 11930:2012 (procedure for interpreting data prepared by a preservation efficacy test or microbiological risk evaluation, or both thereof).

A challenge test was carried out to the three groups of bacteria, yeasts and filamentous fungi as following.
Bacteria: *stapylococcus aureus* NBRC13276, *Escherichia coli* NBRC3972
Yeasts: *Candida albicans* NBRC1594
Filamentous fungi: *Aspergillus brasiliensis*
<Preparation of Inoculation Bacterial Solution>
Preparation of inoculation bacterial solution: a bacterial solution was prepared according to ISO 11930:2012.
Bacteria: a bacterial solution was prepared for each bacterial species according to ISO 11930:2012. Two kinds of the bacterial solutions adjusted to $1 \times 10^7$ to $1 \times 10^8$ cfu/ml for each bacterial species were mixed at an equivalent amount to prepare the inoculation bacterial solution.
Yeasts: a bacterial solution was prepared according to ISO 11930:2012 so as to be $1 \times 10^6$ to $1 \times 10^7$ cfu/ml.
Filamentous fungi: a bacterial solution was prepared according to ISO 11930:2012 so as to be $1 \times 10^6$ to $1 \times 10^7$ cfu/ml.
<Inoculation>
An amount of 1 mass % of the bacterial solution was inoculated into the aqueous ink composition for writing instruments.
<Storage>
The inoculated bacterial solution was stored at a temperature of 22.5±2.5° C. and subjected to detection cultivation at designated intervals.
<Detection Cultivation>
The bacteria were cultured on SCD agar medium, the yeasts were cultured on SD agar medium, and the filamentous fungi were cultured on PD agar medium, wherein they were coated respectively on ten media at a total amount of 1 g; the fungi and the yeasts were cultured at 32.5° C. for two days, and the filamentous fungi were cultured at 22.5° C. for five days.
<Evaluation Criteria>
A: no colony appears on the 7th day
B: no colony appears on the 21th day
C: several to several ten colonies appear on the 28th day
D: colonies grow larger on the 28th day

TABLE 1

| | | Particles | | | | | | | |
|---|---|---|---|---|---|---|---|---|---|
| | | A | B | C | D | E | F | G | H |
| R structure in Formula (I) | iso-butyl | 4 | | | | | | | 4 |
| | n-butyl | | 4 | | | | | | |
| | tert-butyl | | | 4 | | | | | |
| | ethyl | | | | 4 | | | | |
| | n-propyl | | | | | 4 | | | |
| | n-octyl | | | | | | 4 | | |
| | 2-octyl | | | | | | | 4 | |
| Preservative · fungicide | benzoiso-thiazoline | | | | | | | | 2 |
| Acid | phosphoric acid | 0.2 | 0.2 | 0.2 | 0.2 | 0.2 | 0.2 | 0.2 | 0.2 |
| Emulsifier | Polyoxyethylene sorbitan monopalmitate (20E.O.) | 2 | 2 | 2 | 2 | 2 | 2 | 2 | 2 |
| Water (distilled water) | | 93.8 | 93.8 | 93.8 | 93.8 | 93.8 | 93.8 | 93.8 | 91.8 |
| Average particle diameter (nm) | | 108 | 125 | 138 | 123 | 111 | 128 | 143 | 156 |

TABLE 2

| | Example | | | | | | | | | | Comparative Example |
|---|---|---|---|---|---|---|---|---|---|---|---|
| | 1 | 2 | 3 | 4 | 5 | 6 | 7 | 8 | 9 | 10 | 1 |
| Colored resin fine particle dispersion | 50 | 50 | 50 | 50 | 50 | 50 | 50 | 50 | 50 | 50 | 50 |
| Particle A | 20 | | | | | | | | 0.8 | 40 | |
| Particle B | | 20 | | | | | | | | | |
| Particle C | | | 20 | | | | | | | | |
| Particle D | | | | 20 | | | | | | | |
| Particle E | | | | | 20 | | | | | | |
| Particle F | | | | | | 20 | | | | | |
| Particle G | | | | | | | 20 | | | | |
| Particle H | | | | | | | | 20 | | | |
| Triethanolamine | 1 | 1 | 1 | 1 | 1 | 1 | 1 | 1 | 1 | 1 | 1 |
| Ethylene glycol | 5 | 5 | 5 | 5 | 5 | 5 | 5 | 5 | 5 | 5 | 5 |
| Water (distilled water) | 24 | 24 | 24 | 24 | 24 | 24 | 24 | 24 | 43.2 | 4 | 44 |
| Evaluation Bacteria | A | B | B | B | B | A | A | A | B | A | D |
| Yeasts | A | B | A | B | B | A | A | A | B | A | D |
| Filamentous fungi | A | A | B | B | B | A | A | A | B | A | D |

In view of the results shown in Tables 1 and 2, it has been found that Examples 1 to 10 falling in the scope of the present invention had superiority in an antiseptic effect (fungous resistance and mildew resistance) to Comparative Example 1 falling outside the scope of the present invention.

Further, the respective aqueous ink compositions for writing instruments of Examples 1 to 10 were stored at ambient temperature (25° C.) for 3 months and then subjected to visual human evaluation of aggregates and the like to find that no aggregates were found at all and that storage stability was good.

Further, water-based marking pens were prepared using the respective aqueous ink compositions for writing instruments prepared in Examples 1 to 10 after evaluating the storage stability described above. To be specific, the marking pens (brand name: PROPUS WINDOW PUS-102T, pen tip; wide: PE resin, narrow: PET fiber, manufactured by Mitsubishi Pencil Co., Ltd.) were charged with the respective aqueous ink compositions described above to prepare marking pens. The respective marking pens obtained above were used to draw a spiral of ten circles having a diameter of about 2 cm continuously on PPC paper to find that the marking pens made no blurring and had good performance of writing.

INDUSTRIAL APPLICABILITY

The aqueous ink compositions for writing instruments suitable for writing instruments such as signing pens, marking pens, ball point pens and the like are obtained.

What is claimed is:

1. An aqueous ink composition for writing instruments characterized in that at least particles comprising principally a polymer having a structure represented by the following Formula (I) in a repetitive unit are contained as an active ingredient and that a content thereof is 0.1 to 30 mass %:

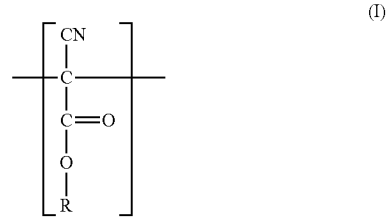

wherein R is an alkyl group having 2 to 8 carbon atoms.

2. The aqueous ink composition for writing instruments as described in claim 1, wherein the particles have an average particle diameter of 10 to 800 nm.

* * * * *